Sept. 26, 1961 R. R. KELLOGG 3,001,365
SHUT-OFF VALVE
Filed May 27, 1957 2 Sheets-Sheet 1

INVENTOR.
RAY R. KELLOGG

BY
ATTORNEY

Sept. 26, 1961 R. R. KELLOGG 3,001,365
SHUT-OFF VALVE
Filed May 27, 1957 2 Sheets-Sheet 2

INVENTOR.
RAY R. KELLOGG
BY
ATTORNEY

United States Patent Office 3,001,365
Patented Sept. 26, 1961

3,001,365
SHUT-OFF VALVE
Ray R. Kellogg, Pasadena, Calif., assignor to Aerojet-General Corporation, Azusa, Calif., a corporation of Ohio
Filed May 27, 1957, Ser. No. 661,962
3 Claims. (Cl. 60—39.09)

This invention relates to means for shutting off the flow of propellant to liquid fuel rocket motors.

In rocket motors the propellant is of a highly combustible nature and can be safely burned only under carefully controlled conditions. In the case of a bi-propellant motor, using a highly combustible gasoline as a fuel (J.P. 4, for example) with fuming nitric acid as an oxidizer, the correct ratio of fuel to oxidizer is essential for complete combustion.

The invention is specifically described with relation to a bi-propellant motor although the basic elements thereof are not necessarily restricted thereto as will be pointed out in the specification.

The propellant liquid is injected into the combustion chamber of a liquid fuel rocket engine through means acting to atomize it in order to insure even and complete combustion. In the case of bi-propellant motors, the fuel and oxidizer are injected under pressure separately and simultaneously through a plurality of fine holes in an injector plate forming the inner end of the combustion chamber.

Combustion of the propellant in the combustion chamber may cease or fail to be initiated for a variety of reasons, for instance, the ignition means may fail when starting the engine, the pumps or other means usually used for pressurizing the fuel and oxidizer may fail to operate properly, either in starting the engine or in flight, the supply of propellant may be purposefully cut off because of malfunctions in starting, and for other reasons.

Since the liquid fuel has to flow through passages to reach the holes in the injector plate and these passages have to be supplied from a manifold it will be evident that a considerable volume of fuel is in the manifold and passages downstream of the control valves so that when the valves are shut off, the fuel may dribble into the combustion chamber and accumulate therein in a quantity sufficient to cause detonations. Since the fuel and oxidizer are no longer present in the combustion chamber for safe combustion, this may result in severe damage or destroy the rocket.

Various means are used to avoid the dangerous accumulation of fuel under these circumstances in the combustion chamber, such as the provision of sequence valves which are intended to insure that the supply of oxidizer is cut off later than the fuel valve so that sufficient oxidizer is supplied to safely burn such fuel residue, or purge systems are provided, designed to blow out of the fuel passages such residual fuel into the atmosphere, but it will be evident that such arrangements add to the complexity of the rocket motor controls, are themselves subject to malfunctions and cannot be expected to deal with all the malfunction conditions that may occur; in any event it will be evident that the basic consideration is to restrict the fuel in the passages downstream of the control valves to the smallest quantity possible.

The general object of the invention is to provide means effective to shut off propellant entering a liquid fuel rocket motor, such means being arranged to insure a minimum of residual fuel in the passages of the injector plate after shut off of the propellant control valves.

An object of the invention is to provide simple, positive, and durable means arranged in close proximity to the fuel outlets into the combustion space, for shutting off the flow of propellant in liquid fuel rocket motors.

A further object of the invention is to provide means for shutting off the flow of propellant in liquid fuel rocket motors which may be readily incorporated in the injector plate of the combustion chamber without unduly increasing the weight thereof and may easily be inspected or replaced.

Another object of the invention is to provide means for shutting off the flow of propellant to a rocket motor which enables the proper carrying out of the operation without the necessity of complicated valving arrangements.

With these and other objects in view, the invention comprises the use of diaphragm means arranged in the injector plate and operated by fluid or gas pressure on the shutting off of propellant flow to the motor to shut off the flow thereof through the injector plate so that the propellant enabled to dribble into the combustion space is reduced to that actually in the discharge orifices in the plate downstream of the diaphragm, which is inconsequential in amount.

Still further features and objects of the invention will hereinafter appear from the following specifications and accompanying illustrative drawings.

Figure 1:
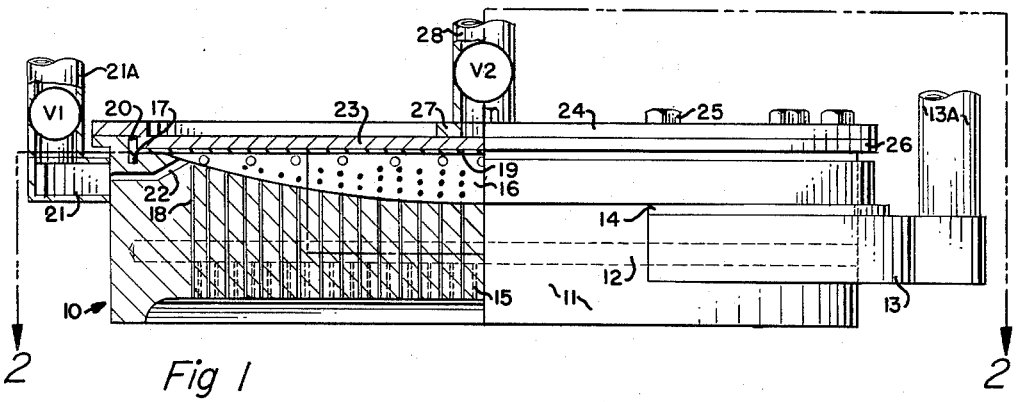
FIG. 1 is a side elevation partly in central vertical section.

Referring now to FIG. 1 which shows the injection plate of a bi-propellant rocket motor, the injection plate assembly is generally indicated by the numeral 10 and comprises a plate 11 cast or machined to provide spaced transverse channels 12 in a lower plane of the plate for oxidizer.

The oxidizer is supplied by manifold 13 from pipe 13a. Manifold 13 is welded to a ring 14 forming a radially projecting flange which may be cast or welded to the edge of plate 11. Holes 15 drilled from the bottom of the channels through the plate deliver oxidizer into the combustion chamber (not shown) in the form of a plurality of diffused jets. The upper surface of plate 11 is downwardly dished or recessed providing the lower wall of a fuel chamber 16. A peripheral recess 17 is provided around the fuel chamber 16 and holes 18 are drilled from the fuel chamber through the metal between channels 12 and open intermediate holes 15 to deliver the fuel in the form of sprays into the combustion chamber to be intimately mixed with the oxidizer being sprayed from openings 15.

A diaphragm 19 of resilient fuel-resistant material such as synthetic rubber is provided with a beaded edge 20 which is nested in the peripheral recess 17. The fuel is supplied through a manifold 21 welded to ring 15 and is delivered thereto by a fuel supply pipe 21a. Delivery holes 22 are machined through the edge of the plate leading the fuel from manifold 21 to under the edge of diaphragm 19.

A cover 23 is fitted over the upper surface of plate 11 and is provided with an upstanding flanged edge 24 secured by bolts 25 to the thickened upper edge 26 of plate 11, the lower edge of flange 24 is machined to make a leakproof joint with the bead 20 of diaphragm 19. The cover 23 is provided with a center boss 27 drilled and tapped for the attachment of a pipe 28 for delivering fluid or gas pressure at times into the space above the diaphragm 19. The fluid may be fuel under pressure as shown in FIG. 1 in which the injector plate is designed for use with pressurized propellant system utilizing pumps. The fuel line is shown as controlled by valve V1 and the pipe 28 by valve V2. Valve V1 may be simultaneously operated by a valve (not shown) controlling the admission of oxidizer, and a separately operated valve may be utilized for introducing pressure above the diaphragm. The usual earlier opening and later closing of the oxidizer valve are provided for to insure an oxidizing atmosphere for the combustion chamber into which the fuel is injected to insure safe burning of any residual fuel in the injector left after the fuel is cut off. Any suitable valve arrangement may be used; for instance, the propellant may be controlled by valves of simple design, the diaphragm being operated by an additional valve controlling the line from a vessel containing a suitable medium under pressure. It should be noted that the diaphragm shut off element may be used for mono-propellant rocket engines by utilizing a shallower injector plate without the channels and manifold for oxidizer, in this case the whole surface of the dished upper surface of the plate being drilled for the passage of the monopropellant.

Figure 3:
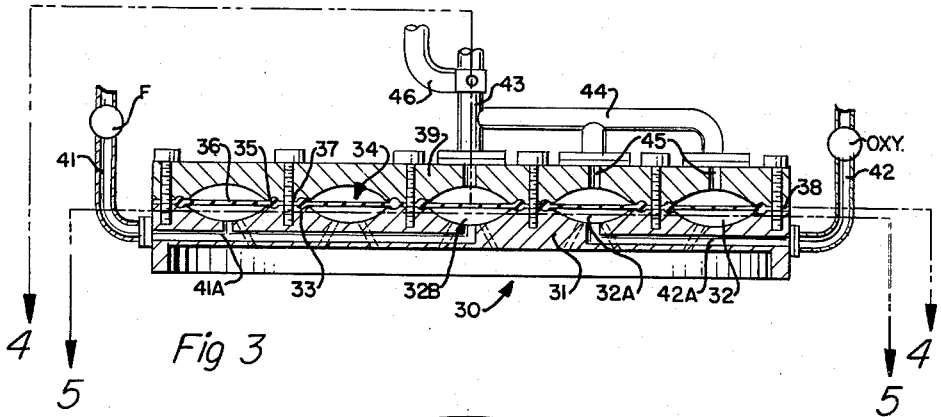
FIG. 3 is a central vertical section of another embodiment of the invention.
Figure 4:
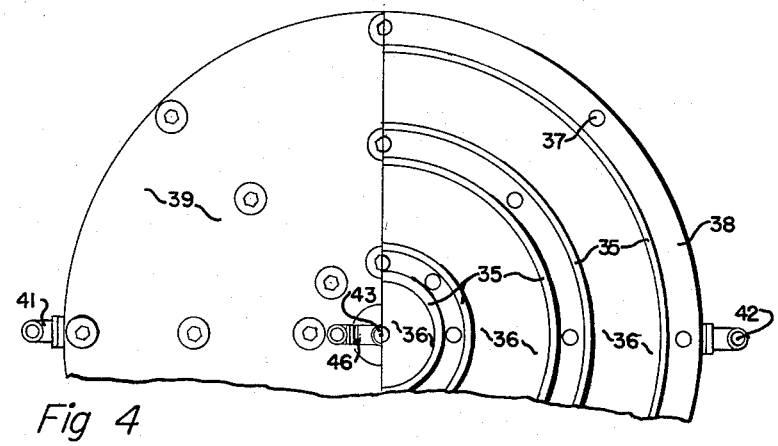
FIG. 4 is a plan view of the embodiment shown in FIG. 3 and partly in section on the line 4—4 in FIG. 3.
Figure 5:
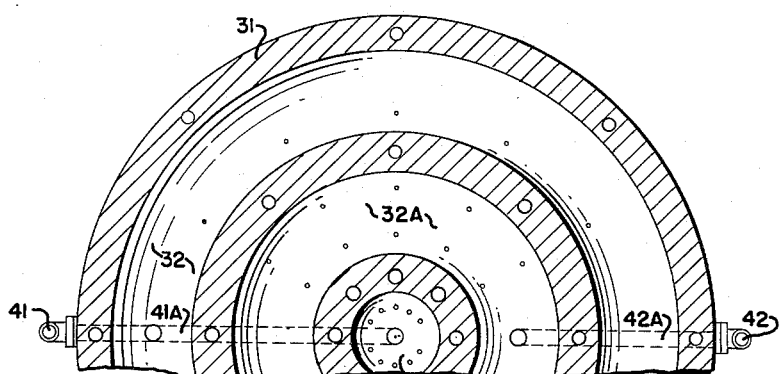
FIG. 5 is a fragmentary plan view of the injector plate of the form of the invention shown in FIGS. 3 and 4 with the cover and diaphragm removed.

FIGS. 3 and 4 illustrate a modification of the injector plate in which a single daiphragm is utilized to control the flow of both fuel and oxidizer. The injector plate is generally indicated at 30 and comprises a face portion 31 formed with concentric grooves 32, 32a and a central recess 32b, groove 32 and central recess 32b being utilized for fuel, and groove 32a being utilized for oxidizer. A bead receiving channel 33 is formed around each of the grooves and around the central recess. A single diaphragm 34, a fragmentary face view of which is shown in FIG. 4, is provided with a plurality of concentric beads 35 received in channels 33, intermediate flat portions 36 serving as seals and being provided with holes 37 through which fastening bolts extend and an outer annular sealing flange 38. Fine holes are drilled from the bottom of the channels to the face of the injector plate. The upper or back portion 39 of the injector plate is provided with grooves matching with grooves 32, 32a and a recess matching with recess 32b to form channels for pressure fluid above the diaphragm at times and for flow of the fuel and oxidizer below the diaphragm during supply to the engine.

Fuel is supplied through a pipe 41 provided with valve F and passages 41a are bored in portion 31 for delivering fuel into channel 32 and recess 32b.

Oxidizer is supplied through pipe 42 provided with a valve OXY and passage 42a is bored in face portion 31 for delivering oxidizer to the channel 32a.

Since it is desirable to control the fuel supply, oxidizer supply, and the medium operating the diaphragm separately, a pressurized medium which may be provided for the purpose of pressurizing the propellant tanks may be utilized to operate the diaphragm 34. A conduit 43 is provided leading from a pressure vessel (not shown) containing a medium such as helium under pressure, and a branch pipe 44 serves to lead the pressure medium from pipe 43 to ports 45 opening into the spaces above the diaphragm. A pressure release valve 46 venting to atmosphere is fitted in pipe 43 and operated in unison with the valve controlling the flow of fuel in the case of a bi-propellant supply or of the propellant in the case of a mono-propellant supply, the pressure relief valve being opened when the propellant supply valves are open so there is no back pressure on the diaphragm at that time.

*Operation*

Figure 2:
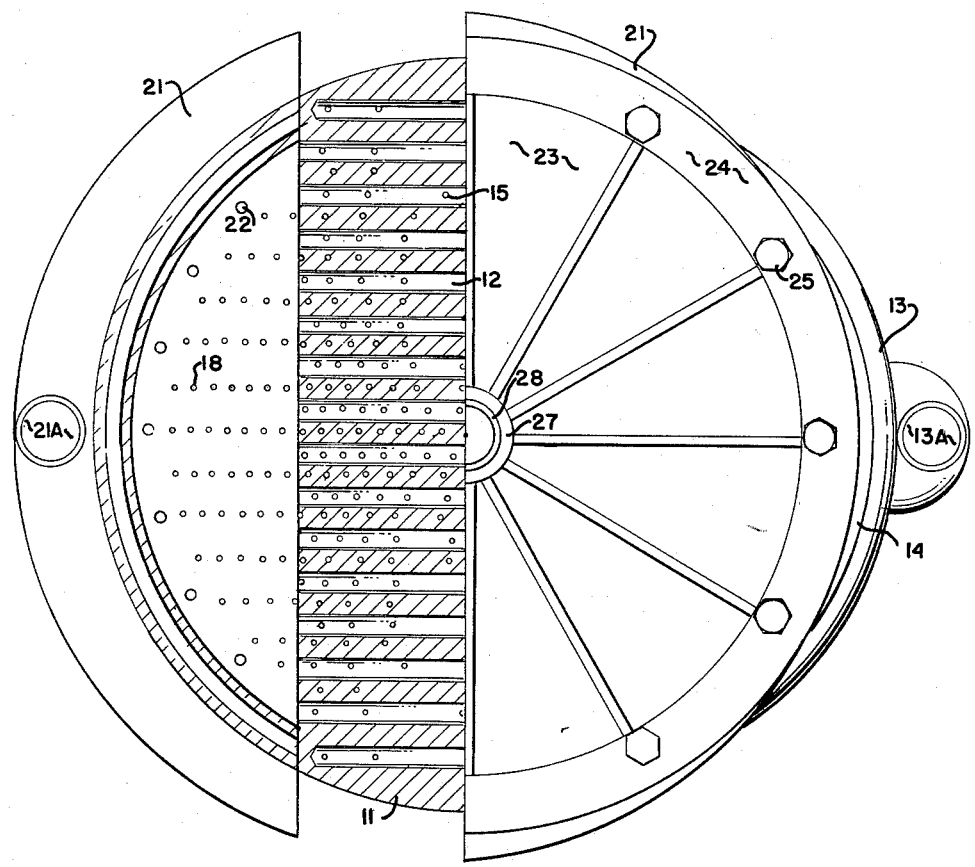
FIG. 2 is a plan view partly in section on the line 2—2 in FIG. 1.

In the form of the invention shown in FIGS. 1 and 2, assuming the rocket motor is supplied by propellants pressurized by pumps with a source of pressure fluid to start the pumps and is in operation but is to be shut down for any reason, the fuel valve V1 is operated to shut off the flow of fuel into the dished spaced in the upper face of the injector plate and simultaneously valve V2 is opened to admit pressure fluid into the space above the diaphragm 19, which during operation of the motor had been maintained in raised position by the flow of fuel. The diaphragm will be immediately forced downward and close outer ends of all fuel openings from the fuel manifold into the combustion chamber, thereby insuring that the only fuel in the injector plate is the very small amount in the passages 18.

The valve controlling the flow of oxidizer will have been operated in timed relation to valve V1 so that sufficient oxidizer enters the oxidizer channels and openings 15 to insure safely burning the small amount of fuel dribbling from the fuel passages 18. If it is desired to restart the motor, valve V2 will be connected to pump suction or to overboard to remove any back pressure on the diaphragm while valve V1 is opened to again admit fuel under pressure through openings 22, the diaphragm therefore will be raised and fuel injected through passages 18 into the combustion space, and an oxidizer supply valve will have been operated to admit oxidizer through pipe 13a into the injector plate and to the combustion chamber in sufficient quantity to insure a sufficiently oxidizing atmosphere to insure complete combustion of the fuel as it is discharged into the combustion space.

As previously pointed out, the diaphragm is operated from a pressure vessel containing a gaseous medium, which may be helium or air since there is no communication between opposite faces of the diaphragm, and valve V2 would be operated in timed relation thereto.

The operation of the form of the invention shown in FIGS. 3 and 4 is similar to that described so that specific description thereof is not thought necessary.

It is pointed out that the provision of a diaphragm to ensure positive shut off of propellant or fuel at the injector plate has numerous advantages among which is the achievement of a minimum amount of residual propellant or fuel remaining in the injector plate immediately following shutoff, the simplification of valve construction possible while providing better control of the functioning of the engine, and the elimination of the usual dump valve provided to get rid of excess fuel or propellant downstream of the shut off valves, as well as elimination of other means for purging surplus fuel or propellant.

The diaphragm itself may be readily molded to close tolerances by standard practices from suitable known flexible materials and will be free from any appreciable wear or deterioration since it is protected by the cooling effect of the propellant flowing through the injector plate so that the diaphragm is both durable and free from distortion affecting mechanical parts and caused by distortions of the injector plate due to wide fluctuations in temperature thereof.

Construction and assembly operations are simple and the removal of a minimum of parts enables the diaphragm to be inspected or replaced.

It should also be noted that while the upper surface of the member in which the injector plate is mounted has been shown as dished, if preferred this surface could be made flat, while the inner surface of the cap member may be dished to provide for movement of diaphragm.

Preferred embodiments of the invention have been specifically described and illustrated by way of example but not as limitative of the invention since various modifications may be made therein by those skilled in the art without departing from the scope of the invention as defined by the appended claims.

I claim:

1. An injector plate assembly for liquid propellant rocket engines comprising a face portion having concentric grooves therein for the flow of propellant therethrough, and holes drilled from said grooves to the face of said face portion for spraying propellant into a combustion chamber; a back portion having concentric grooves matching the grooves in the face portion, said face grooves and back grooves together forming channels; a unitary diaphragm of resilient material clamped between the face and back portions of the injector plate by the peripheral portions of said face and back portions surrounding the channels therein; fastening means clamping said face and back portions together around the channels in said injector plate; conduit means leading propellant into said channels between the flexible diaphragm means and the face portion of the injector plate; and means for directing pressure fluid at times into said channels between the flexible diaphragm means and the back portion of said injector plate whereby said diaphragm may be urged into a position obstructing said holes in said face portion to obstruct the further flow of propellant therethrough.

2. An injector plate assembly as set forth in claim 1 and in which alternate channels in said plate are utilized for fuel and oxidizer respectively; said propellant conduit means comprising separate conduit means for leading fuel into the fuel channel and for leading oxidizer into the oxidizer channel; said unitary resilient diaphragm extending through the channels for both fuel and oxidizer; and valve means for venting said channels between the diaphragm means and the back portion of said injector plate of pressure fluid when fuel and oxidizer are flowing through said fuel and oxidizer channels.

3. An injector plate assembly for bi-propellant liquid fuel rocket motors, comprising: an injector plate having a plurality of concentric chambers for the separate passage of fuel and oxidizer in alternate chambers; passages leading from the combustion chamber of the motor to each of said concentric chambers; a unitary flexible diaphragm arranged within said injector plate to bifurcate each concentric chamber and normally permitting flow from said chambers through said passages on one side of said flexible diaphragm to the combustion chamber free of pressure from said diaphragm; means for applying fluid pressure to the other side of said flexible diaphragm to expand said diaphragm in a direction against said passages to seal them against flow of fuel and oxidizer; and separate conduit means delivering fuel and oxidizer respectively to said chambers.

References Cited in the file of this patent

UNITED STATES PATENTS

| 2,217,649 | Goddard | Oct. 8, 1940 |
| 2,532,709 | Goddard | Dec. 5, 1950 |
| 2,753,687 | Wissley et al. | July 10, 1956 |
| 2,754,656 | Munger | July 17, 1956 |
| 2,808,701 | Lewis | Oct. 8, 1957 |
| 2,928,236 | Kircher et al. | Mar. 15, 1960 |
| 2,929,208 | Schultz | Mar. 22, 1960 |

FOREIGN PATENTS

| 731,739 | Great Britain | June 15, 1955 |